United States Patent
Meiss et al.

(12) 
(10) Patent No.: US 6,173,819 B1
(45) Date of Patent: Jan. 16, 2001

(54) PARTIALLY LINED DISC BRAKE

(75) Inventors: Michael Meiss, Friedberg; Thomas Kirschner, Frankfurt; Winfried Gerhardt, Frankfurt; Hans-Dieter Leidecker, Frankfurt; Rolf Weiler, Eppstein; Hans-Peter Metzen, Bad Homburg, all of (DE)

(73) Assignee: Continental Teves AG & Co. OHG (DE)

( * ) Notice: Under 35 U.S.C. 154(b), the term of this patent shall be extended for 0 days.

(21) Appl. No.: 09/194,841

(22) PCT Filed: Apr. 25, 1997

(86) PCT No.: PCT/EP97/02143

§ 371 Date: Apr. 22, 1999

§ 102(e) Date: Apr. 22, 1999

(87) PCT Pub. No.: WO97/46812

PCT Pub. Date: Dec. 11, 1997

(30) Foreign Application Priority Data

Jun. 3, 1996 (DE) ................................. 196222095

(51) Int. Cl.[7] .................................................. F16D 55/00
(52) U.S. Cl. ........................ 188/73.31; 188/71.1; 188/370
(58) Field of Search ............................... 188/73.31, 71.1, 188/72.1, 72.3, 72.4, 73.32, 73.39, 73.43, 73.44, 73.45, 73.37, 370

(56) References Cited

U.S. PATENT DOCUMENTS

| | | |
|---|---|---|
| 3,884,332 | 5/1975 | Walther et al. . |
| 3,997,032 | 12/1976 | Kondo . |
| 4,540,068 | 9/1985 | Ritsema . |
| 4,553,645 | 11/1985 | Mery . |
| 4,613,018 | * 9/1986 | Weiler et al. ........................ 188/72.4 |
| 4,823,920 | 4/1989 | Evans . |
| 5,249,649 | * 10/1993 | Emmons ........................... 188/73.47 |
| 5,472,068 | * 12/1995 | Weiler et al. ...................... 188/73.44 |
| 5,540,311 | * 7/1996 | Kobayashi et al. .................. 188/370 |

FOREIGN PATENT DOCUMENTS

| | | |
|---|---|---|
| 39 03 251 | 11/1989 | (DE) . |
| 39 21 346 | 1/1991 | (DE) . |
| 42 36 683 | 5/1994 | (DE) . |
| 43 18 745 | 12/1994 | (DE) . |
| 44 01 843 | 7/1995 | (DE) . |
| 2 115 892 | 12/1982 | (GB) . |
| 2 262 145 | 9/1993 | (GB) . |

OTHER PUBLICATIONS

BOETZ, V.: Bearbeitung von Bremszylindern für Scheibenbremsen auf Sondermaschinen. In: Werkstatt und Betrieb, 101.Jg., 1968, H.10, S. 625–627.

* cited by examiner

Primary Examiner—Robert J. Oberleitner
Assistant Examiner—Pamela J. Rodriguez
(74) Attorney, Agent, or Firm—Rader, Fishman & Grauer PLLC

(57) ABSTRACT

The present invention relates to a spot-type disc brake with a brake housing including a first side element, a second side element and a bridge element connecting the side elements and straddling a brake disc and with at least one arm arranged on the leading and/or trailing end, of the brake housing, straddling the brake disc and connecting the first side element with the second side element. The essence of the invention is that at least one side element is provided with a recess.

13 Claims, 3 Drawing Sheets

PARTIALLY LINED DISC BRAKE

TECHNICAL FIELD

The present invention relates to brakes and more particularly relates to a spot-type disc brake.

BACKGROUND OF THE INVENTION

A generic spot-type disc brake is referenced in DE-OS 39 21 346 A 1. The brake housing of the spot-type disc brake includes a first side element with a housing for an actuating device of a first brake shoe and a second side element for applying a second brake shoe, the first side element being connected with the second side element by means of a bridge element. Furthermore, an arm is provided on the leading and also on the trailing end of the brake housing straddling the brake disc and connecting the two side elements.

It is true that this referenced disc brake permits to increase the diameter of the brake disc with a given wheel diameter without the brake housing losing rigidity. But it is costly to manufacture such a spot-type disc brake because particularly the manufacturing process of the brake housing includes several extensive machining and mounting operations. Finally, the heavy weight of this disc brake is considered to be a disadvantage.

The object of the present invention is therefore to provide a high-performance spot-type disc brake featuring light weight but increased stiffness, which, in addition, can be manufactured in a simple and cost-efficient way.

According to the present invention at least one side element is provided with a recess. It is an advantage that such a recess simplifies the manufacture considerably. In addition to this the recess results in less weight.

Moreover it is an advantage if the recess shows a free opening, because such an embodiment facilitates the manufacture even further.

DETAILED DESCRIPTION OF THE PREFERRED EMBODIMENTS

Figure 1:
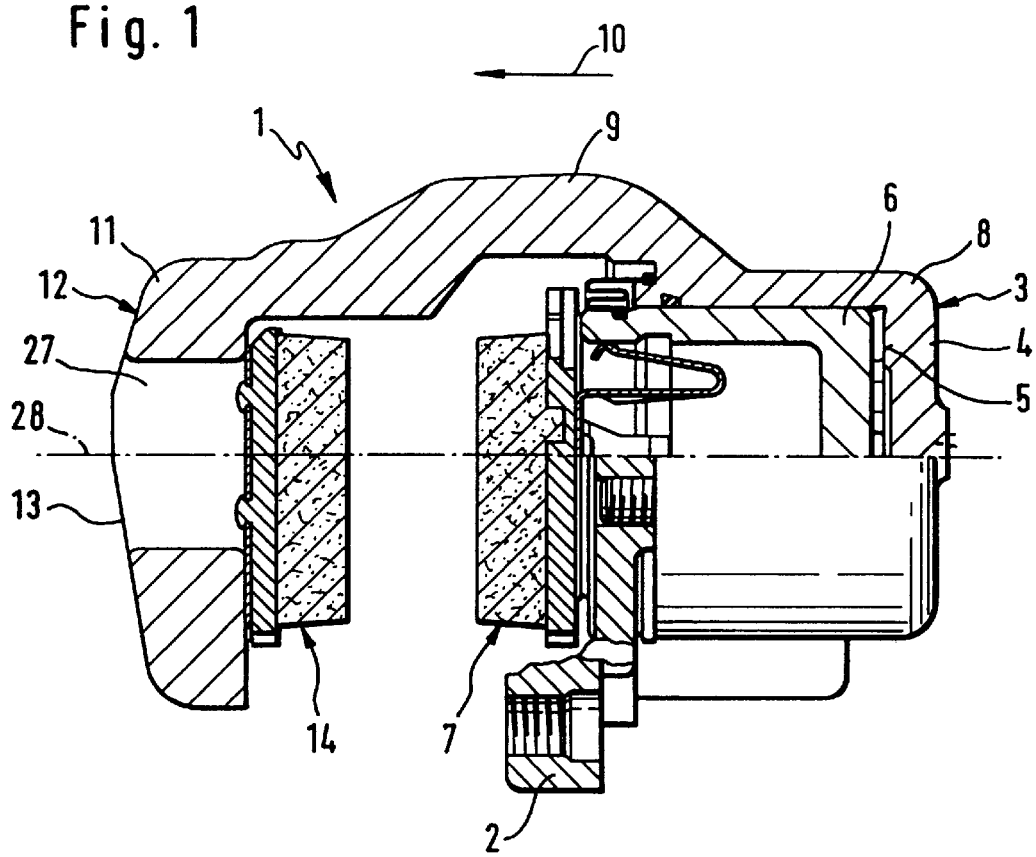
FIG. 1 is a section through a brake housing.
Figure 2:
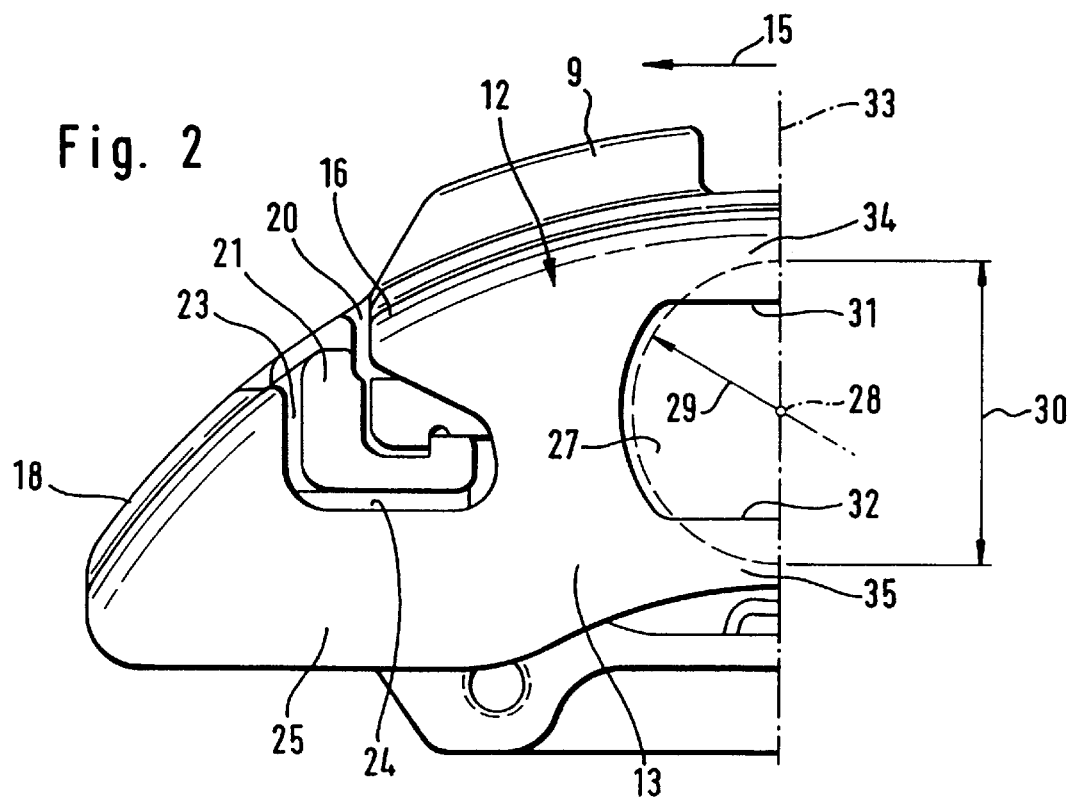
FIG. 2 is a side view of the brake housing according to FIG. 1, cut off along a radial center line.

FIGS. 1 and 2 show a frame-type brake housing 1 for a spot-type disc brake which can be attached with a brake support 2 to an axle element of the motor vehicle. The brake housing 1 which is preferably built as a fist-type frame, is arranged in such a way that it is axially movable on the brake support 2 and includes a first side element 3 with a leg 4 on which a housing 5 for an actuating device 6 is foreseen. The actuating device 6 acts upon a first brake shoe 7 so that this can be forced to bear against a brake disc (not shown). A bridge element 9, essentially perpendicular to leg 4 and formed of one piece according to the embodiment, straddling brake disc and brake shoes is located on shoulder 8. In principle the bridge element 9 can also be fastened differently on the side element 3, particularly it can be screwed. On the outer end 11 (seen in axial direction 10) of bridge element 9 follows a second side element 12 with a leg 13 extending essentially parallel to side element 3 and acting upon a second brake shoe 14. In circumferential direction 15 there is one arm 18, 19 on the leading as well as on the trailing end 16, 17 of the brake housing 1 (according to the direction of rotation of the brake disc) which, starting from the first side element 3, straddles the brake disc and extends radially inward on the front and the back of the brake shoe.

As an alternative embodiment, it is also possible to use only one arm on one of the end pieces 16, 17. Between each arm 18, 19 and the bridge element 9 there is a recess 20 arranged parallel thereto and extending over the whole length of the bridge into the leg 13.

According to FIG. 2 the brake support 2 engages at least in part into the recess 20 with retention and guide means 21 for the brake shoes 7, 14. Sufficient backlash is foreseen between recess 20 and retention and guiding means 21 of the brake support 2. The recess 20 in leg 13 is L-shaped, includes a section 23 aligned with the recess part 22 on the side of the bridge element and extending radially inward, as well as a section 24 being essentially perpendicular thereto and extending towards axis 28 of housing 5. In proximity to the second side element 12 each arm 18, 19 includes a web 25, 26 arranged tangentially to the brake disc and extending in circumferential direction 15, which connects arm 18, 19 with the respective side element 12. The webs 25, 26 extend essentially parallel to legs 4, 13. The side elements 3, 12 encompass the brake disc together with the bridge element 9 and the arms 18, 19 as well as the webs 25, 26 in a U-shaped manner and like a frame in order to comply with the stress requirements. This ensures that the forces transmitted by the brake shoes 7, 14 are received particularly by the arms 18, 19 and the webs 25, 26 as well as by the bridge element 9. The brake shoes 7, 14 abut preferably with their guide surfaces on the brake support 2 arranged on a vehicle or a vehicle component. In principle a push/pull support of the brake shoes 7, 14 by means of hammer heads is used, but it is also possible to envision a pull/push support in which the brake shoes 7, 14 are under tensile load at the beginning of the braking operation, while a compressive stress is developed in presence of higher braking forces if one guiding surface abuts on the trailing end of the brake shoe 7, 14. The leg 13 of the second side element 12 shows a recess 27 arranged in alignment with an axis 28 of the housing 5 for the actuating element 6. This recess 27 can be, for instance, a cylindrical hole the clear diameter 29 of which is bigger than or equal to the piston diameter 30 of the actuating device 5. In the drawing the recess 27 is formed like a slot with two parallel lateral faces 31, 32 spaced from each other and extending essentially perpendicular to a radial center line 33. Even in this case the biggest clear diameter 29 is bigger than or equal to the piston diameter 30. Radially above and below the recess 27, referred to axis 28, the leg 13 includes one web 34, 35 respectively reinforcing the side element 12. The height of the webs 34, 35 is in accordance with the total length of the leg 13 on the one hand and with the necessary abutment surface for the second brake shoe 14 on the other hand.

In case of a brake housing according to FIGS. 1 and 2 the machining tool for the housing 5 can be inserted in a particularly simple way through the recess 27 into the brake housing 1 even if this, as represented in the drawing, is made of one piece, so that the manufacturing costs are considerably reduced. In addition the slot-type form of the recess 27 results in a particularly rigid brake housing 1 with small volume absorption.

Figure 3:
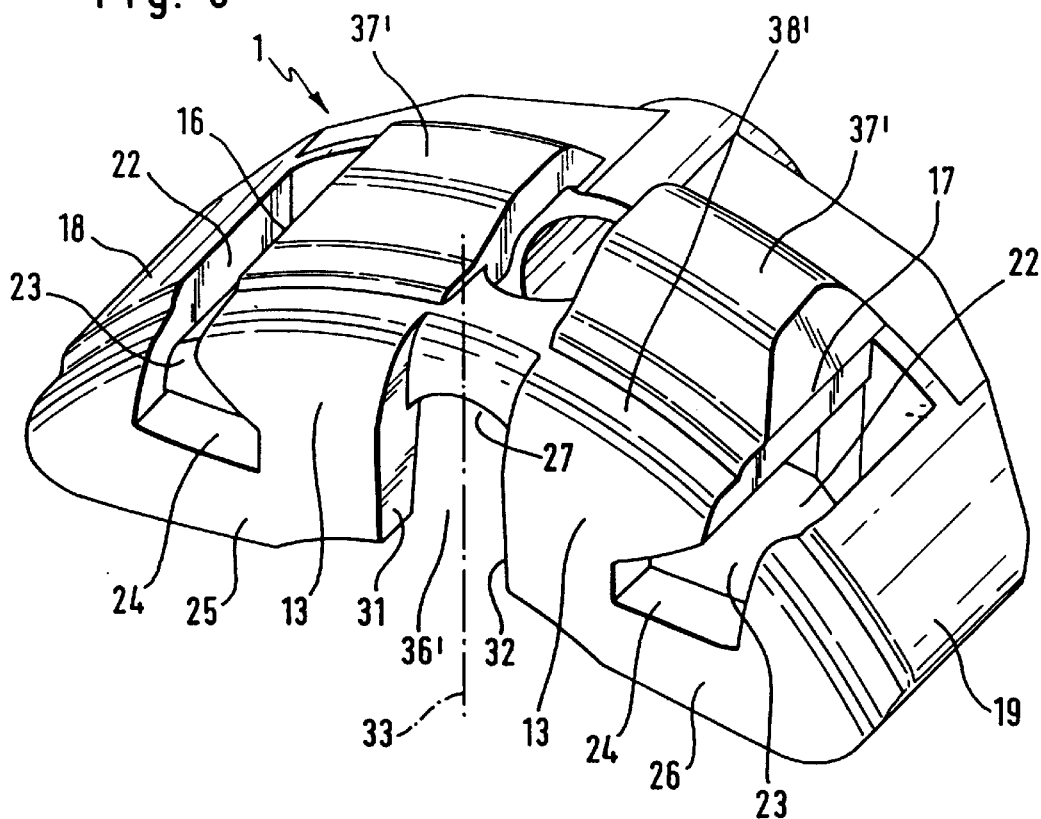
FIG. 3 is a perspective view of an embodiment according to the invention.
Figure 4:
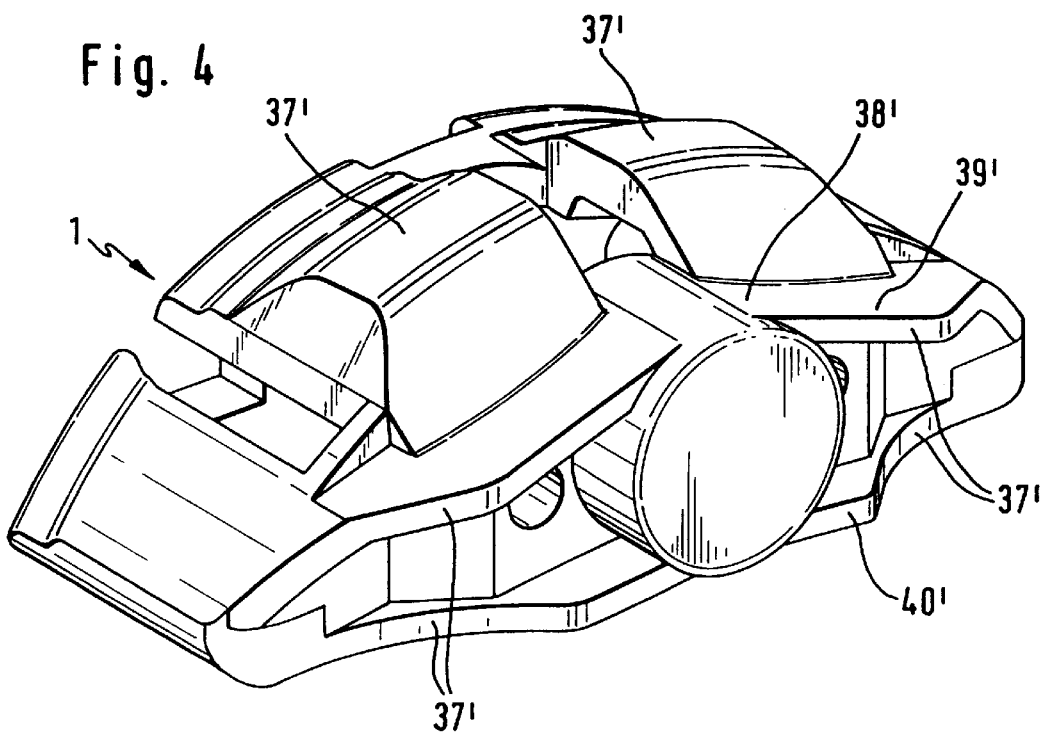
FIG. 4 is another perspective view of the embodiment according to FIG. 3.

In the embodiment according to FIGS. 3 and 4 the same parts are identified with the same reference numerals and additional parts have an additional upstroke. The lateral faces 31, 32 are arranged essentially parallel to the center line 33 and the recess 27 is provided with a free opening 36' extending radially inward and pointing away from bridge element 9. For the dimensions of recess 36' applies the same as already indicated for FIGS. 1 and 2. Thus the tool necessary for the machining of the housing 5 can be swiveled in a particularly simple way into the brake housing 1, even if the brake housing 1 is made of one piece. Certainly the lateral faces 31, 32 can be arranged also in such a way that they are inclined towards the center line 33.

The recess 27 divides the leg 13 into two segments which are supported by the arms 18, 19 with webs 25, 26 as well as by the bridge element 9.

In addition to that, the brake housing 1 includes also reinforcing ribs 37' on the top surface 38' of the bridge element 9 as well as in the area of shoulder 39' of the first side element 3 and in the area of the free end 40' of leg 4.

The material that can be used for brake housing 1 and brake support 2 is in particular material for casting as, for instance, soft cast iron or nodular cast iron, but also light alloy, such as aluminum.

Figure 5:
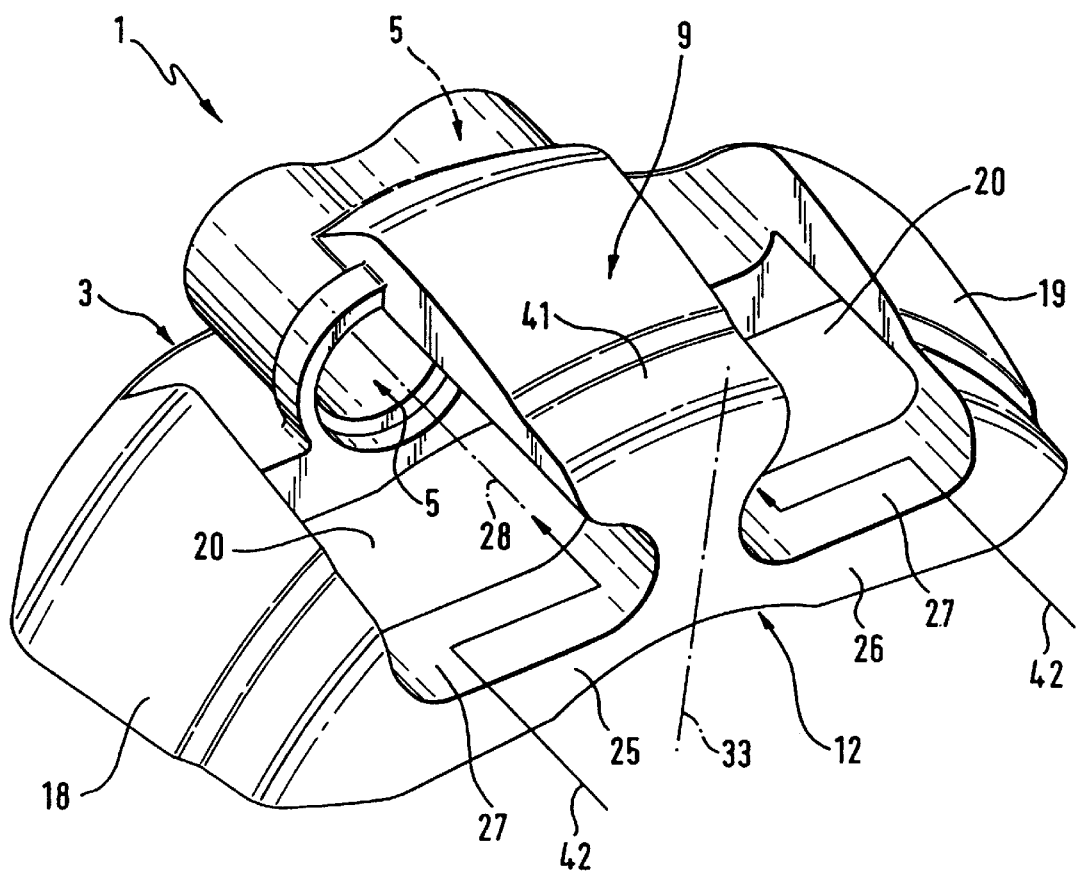
FIG. 5 is a perspective view of a brake housing for two brake pistons.

FIG. 5 represents a further embodiment, i.e. a one-piece brake housing 1 with two housings 5 of a hydraulic actuating device. The brake housing 1 is executed as frame-type caliper and is capable, by means of the two housings 5, of receiving two brake pistons (not shown) thus increasing the braking performance. Just like the configurations with one piston the brake housing 1 includes one inside 3 and one outside side element 12 as well as a bridge element 9 straddling the brake disc (not shown) and connecting the two side elements 3, 12. The bridge element 9 is interrupted by two recesses 20 extending essentially in radial direction so that the bridge element forms a center part 41 and two lateral arms 18, 19 tangentially offset thereto. The center part 41 extends from the inside side element 3 radially above housing 5 over the brake disc. On the outside of brake housing 1 the center part 41 is connected with the lateral arms 18, 19 by means of webs 25, 26 extending in the direction of the secant. This results in a frame-type brake housing 1 permitting a nearly even distribution of the hydraulic clamping force on center part 41 and the two lateral arms 18, 19.

The recesses 20 in bridge element 9 serve mainly for receiving the arms of the stationary brake support straddling the brake disc to which the brake housing 1 is positioned axially displaceable. In addition, the recesses 20 in bridge element 9 merge into the recesses 27 of the outer part of the housing. Every recess 27 in the area facing the plane of symmetry of brake housing 1 is aligned with the pertinent bore axis 28 of the housing 5. This intersection of recess 27 and housing 5 is absolutely necessary in order to produce the piston bores in the two housings of a one-piece brake housing with a cutting tool from the outside of brake housing 1. In particular the machining tool is inserted in the direction of the secant and offset to the housing axis 28 into the brake housing 1, displaced in the direction of the secant to the center plane 33 of the brake housing and is then able to produce the piston bore in axial direction. Thus the machining tool follows the feed direction 42.

Certainly also the frame-type caliper configuration according to FIG. 5 can be made of light alloy to reduce weight. Ideally such a brake housing combines the advantages of a high performance with low volume absorption with a cost-effective manufacture in presence of low weight.

What is claimed is:

1. Spot-type disc brakes, comprising:
a frame-type brake housing arranged on a brake support, including a first side element with a housing for an actuating device of a first brake shoe and with a second side element for acting upon a second brake shoe wherein, the first and second side elements are parallel and connected to one another by means of a bridge element straddling a brake disc, and wherein said first and second side elements are connected to at least one arm arranged on a leading or trailing end piece of the brake housing and straddling the brake disc, which in addition to this connects the first side element with the second side element and wherein, at least one recess is provided in a leg portion of the second side element, wherein the recess is aligned to an axis of the housing for the actuating device and a greatest diameter of the recess is larger than or equal to a piston diameter of the actuating device wherein the second side element is arranged integrally with a recess on the first side element.

2. Spot-type disc brake according to claim 1, wherein the recess is a cylindrical bore.

3. Spot-type disc brake according to claim 1, wherein the recess has the form of a groove and includes at least two parallel lateral faces spaced from each other.

4. Spot-type disc brake according to claim 3, wherein the direction of extension of the lateral faces of said recess groove is arranged essentially parallel to a radial center line of the brake housing.

5. Spot-type disc brake according to claim 3, wherein the lateral faces of said recess groove are arranged essentially perpendicular to the radial center line of the brake housing.

6. Spot-type disc brake according to claim 1, wherein the recess includes a free opening.

7. Spot-type disc brake according to claim 6, wherein the free opening is arranged on the end of the leg remote from the bridge element.

8. Spot-type disc brake according to claim 1, wherein the recess divides the second side element into two segments.

9. Spot-type disc brake according to claim 1, further including a second recess located between the bridge element and said at least one arm wherein said second recess extends over the length of the bridge and is L-shaped in the area of the leg.

10. Spot-type disc brake according claim 1, wherein the brake housing is made of light alloy.

11. Spot-type disc brake according to claim 1, wherein the actuating device includes two housings and wherein the bridge element is provided with two recesses extending essentially in axial direction and merging into said at least one recess on the second side element of the brake housing, each said at least one recess being aligned at least in part with one housing axis.

12. Spot-type disc brakes, comprising:
a frame-type brake housing arranged on a brake support, including a first side element with a housing for an actuating device of a first brake shoe and with a second side element for acting upon a second brake shoe wherein, the first and second side elements are parallel and connected to one another by means of a bridge element straddling a brake disc, and wherein said first and second side elements are connected to at least one arm arranged on a leading or trailing end piece of the brake housing and straddling the brake disc, which in addition to this connects the first side element with the second side element and wherein, at least one recess is provided in a leg portion of the second side element, wherein the recess is aligned to an axis of the housing for the actuating device and a greatest diameter of the recess is larger than or equal to a piston diameter of the actuating device further including a second recess located between the bridge element and said at least one arm wherein said second recess extends over the length of the bridge and is L-shaped in the area of the leg.

13. Spot-type disc brakes, comprising:

a frame-type brake housing arranged on a brake support, including a first side element with a housing for an actuating device of a first brake shoe and with a second side element for acting upon a second brake shoe wherein, the first and second side elements are parallel and connected to one another by means of a bridge element straddling a brake disc, and wherein said first and second side elements are connected to at least one arm arranged on a leading or trailing end piece of the brake housing and straddling the brake disc, which in addition to this connects the first side element with the second side element and wherein, at least one recess is provided in a leg portion of the second side element, wherein the recess is aligned to an axis of the housing for the actuating device and a greatest diameter of the recess is larger than or equal to a piston diameter of the actuating device wherein the actuating device includes two housings and wherein the bridge element is provided with two recesses extending essentially in axial direction and merging into said at least one recess on the second side element of the brake housing, each said at least one recess being aligned at least in part with one housing axis.

* * * * *